(12) United States Patent
Meschenmoser et al.

(10) Patent No.: US 11,086,141 B2
(45) Date of Patent: Aug. 10, 2021

(54) SPECTACLE LENS BLANK, AND METHOD AND DEVICE FOR PRODUCING A SPECTACLE LENS FROM A SPECTACLE LENS BLANK

(71) Applicant: Carl Zeiss Vision International GmbH, Aalen (DE)

(72) Inventors: Ralf Meschenmoser, Essingen (DE); Ralf Vallerius, Heidenheim (DE); Sven Hänsch, Abtsgmünd (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 17/029,202

(22) Filed: Sep. 23, 2020

(65) Prior Publication Data

US 2021/0003862 A1   Jan. 7, 2021

Related U.S. Application Data

(63) Continuation of application No. PCT/EP2019/057331, filed on Mar. 22, 2019.

(30) Foreign Application Priority Data

Mar. 23, 2018  (EP) .................... 18163572

(51) Int. Cl.
*G02C 7/02* (2006.01)
*G02C 7/06* (2006.01)
(Continued)

(52) U.S. Cl.
CPC ............. *G02C 7/02* (2013.01); *G02C 7/024* (2013.01); *G02C 7/027* (2013.01); *G02C 7/06* (2013.01); *G02C 7/10* (2013.01)

(58) Field of Classification Search
CPC ........ G02C 7/02; G02C 2202/08; G02C 7/024; G02C 7/027; G02C 7/06; G02C 7/10;
(Continued)

(56) References Cited

U.S. PATENT DOCUMENTS 3,704,558 A   12/1972 Sarofeen
4,277,891 A *  7/1981 Dick .................... B26B 9/02
                                                      30/316

(Continued)

FOREIGN PATENT DOCUMENTS

CA   2157070 C   5/2001
DE   2208444 A1  9/1972
(Continued)

OTHER PUBLICATIONS

Diepes et al. "Optik and Technik der Brille" [Optics and Technology of Spectacles], Optische Fachveröffentlichung GmbH, Heidelberg, 2005, p. 558, entry "Halbfertigprodukt [Semifinished spectacle lens products or semifinished spectacle lenses]," provided in lieu of p. 560 of the first edition 2002. Relevance is found at least in paragraph [0003] of the specification.

(Continued)

*Primary Examiner* — Jordan M Schwartz
(74) *Attorney, Agent, or Firm* — Thrive IP®; Georg M. Hasselmann

(57) ABSTRACT

A spectacle lens blank has an optically finished surface and a cylinder edge surface, and a protective film applied on the optically finished surface. The protective film is also arranged on the cylinder edge surface. A method for producing a spectacle lens from a spectacle lens blank having an optically finished surface and a cylinder edge surface, in which a protective film is applied onto the optically finished surface is also disclosed. Procedurally, the protective film is also applied onto the cylinder edge surface. Lastly, a device (Continued)

for producing a spectacle lens from a spectacle lens blank having an optically finished surface and a cylinder edge surface is disclosed, in which a protective film is applied onto the optically finished surface. An application unit for applying the protective film onto the cylinder edge surface is also disclosed.

17 Claims, 9 Drawing Sheets

(51) Int. Cl.
*G02C 7/10* (2006.01)
*B29D 11/00* (2006.01)

(58) Field of Classification Search
CPC . A45C 11/005; A45C 2011/006; A45C 11/00; B29D 11/00009; B29D 11/00942; B29D 11/00432
USPC .......................................................... 206/5.1
See application file for complete search history.

(56) References Cited

U.S. PATENT DOCUMENTS

| | | | |
|---|---|---|---|
| 4,300,821 A | 11/1981 | Mignen | |
| 4,826,548 A | 5/1989 | Herbin et al. | |
| 4,959,118 A | 9/1990 | Herbin et al. | |
| 5,343,657 A | 9/1994 | Ohlin | |
| 5,916,017 A | 6/1999 | Sedlock | |
| 6,089,713 A | 7/2000 | Hof et al. | |
| 6,103,148 A | 8/2000 | Su et al. | |
| 6,109,748 A * | 8/2000 | Spector | C09D 127/06 351/159.01 |
| 6,124,906 A | 9/2000 | Kawada et al. | |
| 8,252,368 B2 | 8/2012 | Lacan et al. | |
| 9,500,860 B2 | 11/2016 | Gloege et al. | |
| 9,778,484 B2 | 10/2017 | Hugenberg et al. | |
| 9,817,155 B2 | 11/2017 | Neuffer | |
| 10,010,994 B2 * | 7/2018 | Gacoin | B29D 11/00942 |
| 10,259,744 B2 | 4/2019 | Gloge | |
| 10,338,278 B2 | 7/2019 | Gloege et al. | |
| 2008/0117382 A1 | 5/2008 | Lacan et al. | |
| 2013/0075465 A1 | 3/2013 | Schneider | |
| 2013/0206328 A1 | 8/2013 | Chiu et al. | |
| 2019/0070808 A1 * | 3/2019 | Ihmels | B29D 11/00009 |
| 2020/0262163 A1 * | 8/2020 | Henry | B65D 77/24 |

FOREIGN PATENT DOCUMENTS

| | | |
|---|---|---|
| DE | 7723333 U1 | 11/1977 |
| DE | 3007572 C2 | 12/1982 |
| DE | 102007007161 A1 | 8/2008 |
| DE | 102010048088 A1 | 4/2012 |
| DE | 102012009691 A1 | 11/2013 |
| DE | 102013208310 A1 | 11/2014 |
| DE | 102015209794 A1 | 12/2016 |
| EP | 285490 A1 | 10/1988 |
| EP | 698798 A2 | 2/1996 |
| EP | 955147 A1 | 11/1999 |
| EP | 1269223 A1 | 1/2003 |
| EP | 2138271 A1 | 12/2009 |
| EP | 2266754 B1 | 8/2016 |
| JP | 60135167 A | 7/1985 |
| JP | 2008191186 A | 8/2008 |
| WO | 8002431 A1 | 11/1980 |
| WO | 9710923 A1 | 3/1997 |
| WO | 9710924 A1 | 3/1997 |
| WO | 0068326 A1 | 11/2000 |
| WO | 02092524 A1 | 11/2002 |
| WO | 2004110946 A1 | 12/2004 |
| WO | 2007001251 A1 | 1/2007 |
| WO | 2017046803 A1 | 3/2017 |

OTHER PUBLICATIONS

Din 8580 "Fertigungsverfahren [Manufacturing processes]," Deutsches Institut fuer Normung e.V., Sep. 2003. Relevance is found at least in paragraph [0011] of the specification.
"Ophthalmic optics—Spectacle lenses—Vocabulary (ISO 13666:2012)," German and English version EN ISO 13666:2012, Oct. 2013.
International Search Report issued in PCT/EP2019/057331, to which this application claims priority, dated Jun. 21, 2019, and English-language translation thereof.
International Preliminary Examination Report issued in PCT/EP2019/057331, to which this application claims priority, dated Feb. 27, 2020, and English-language translation thereof.

* cited by examiner

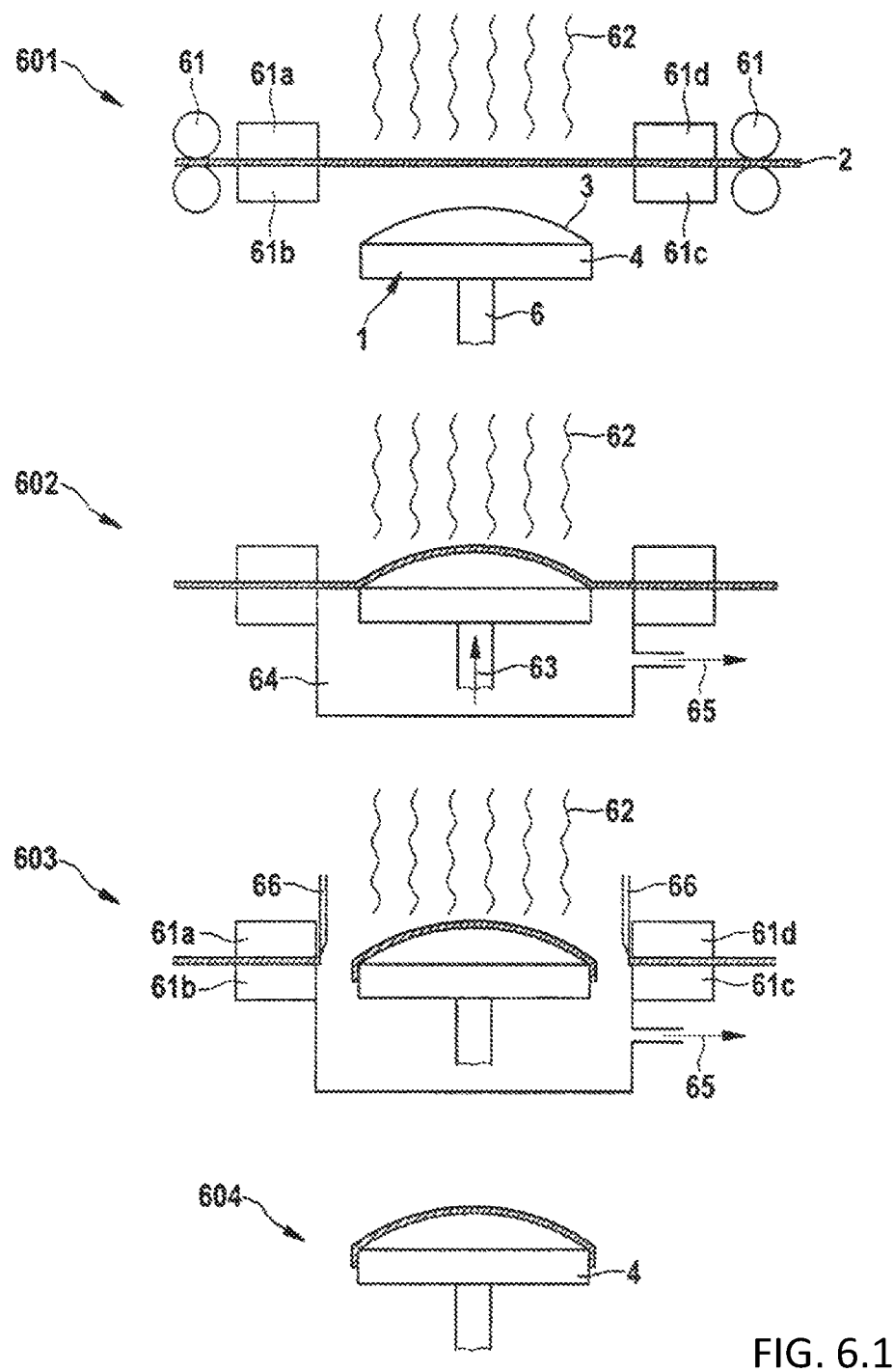
FIG. 6.1

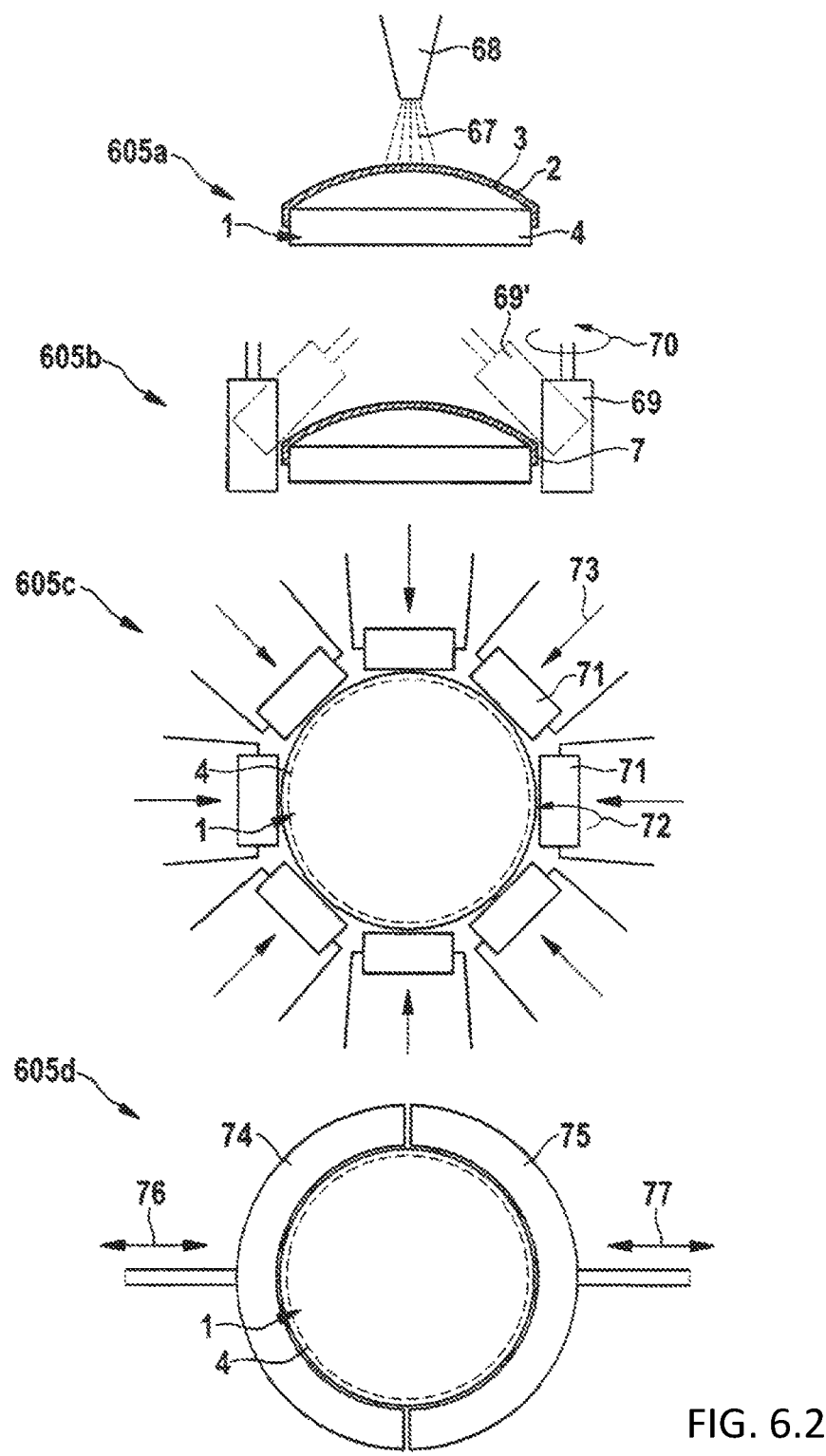
FIG. 6.2

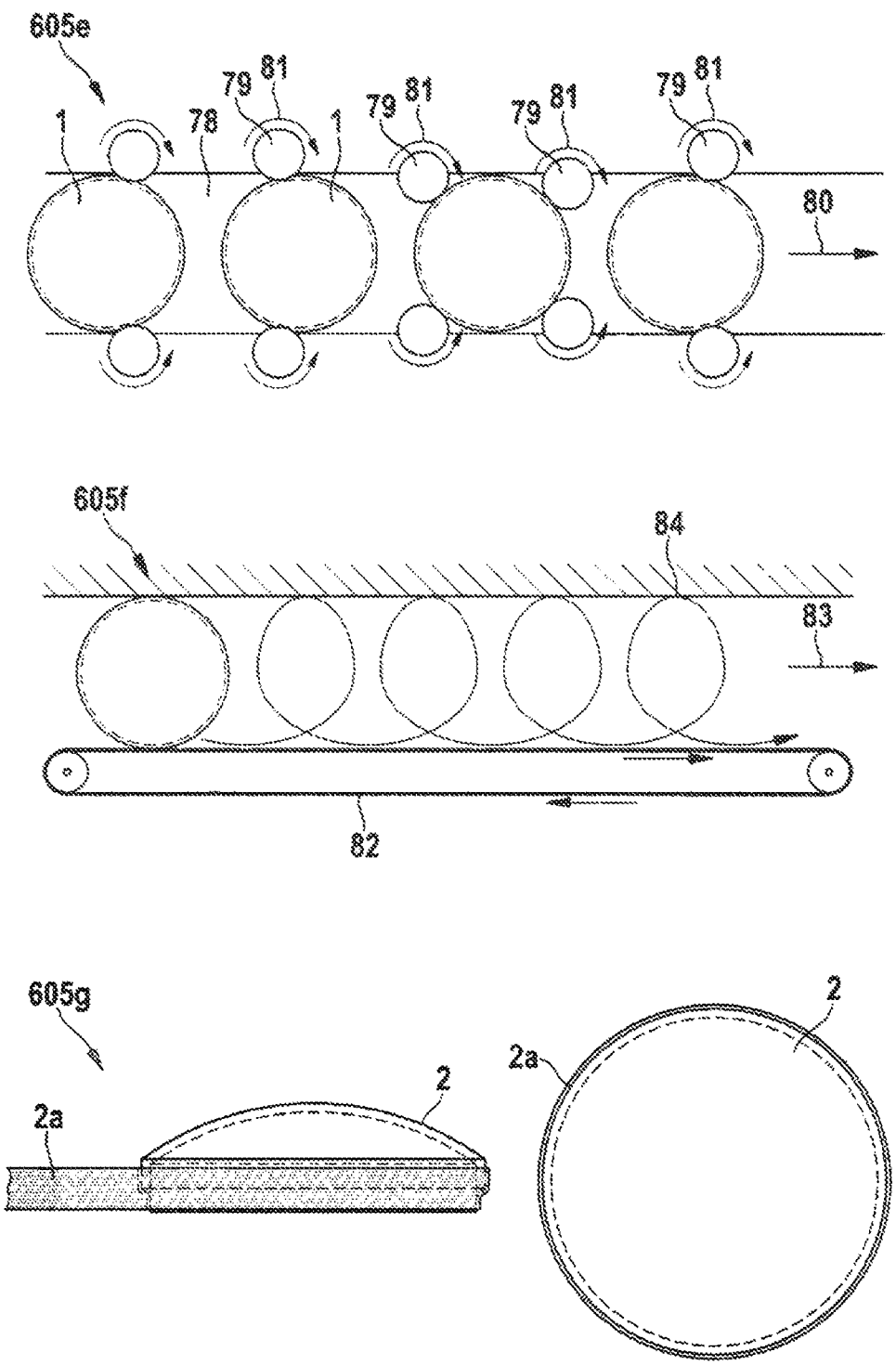
FIG. 6.3

SPECTACLE LENS BLANK, AND METHOD AND DEVICE FOR PRODUCING A SPECTACLE LENS FROM A SPECTACLE LENS BLANK

CROSS REFERENCE TO RELATED APPLICATIONS

This application is a continuation application of international patent application PCT/EP2019/057331, filed Mar. 22, 2019, designating the United States and claiming priority from European application EP 18163572.3, filed Mar. 23, 2018, and the entire content of both applications is incorporated herein by reference.

TECHNICAL FIELD

The disclosure relates to a spectacle lens blank with at least one optically finished surface, that is to say in particular a semifinished spectacle lens with an optically finished surface and a cylinder edge surface and with a protective film on the optically finished surface, and also to a method for producing a spectacle lens from a spectacle lens blank with at least one optically finished surface, that is to say in particular for producing a spectacle lens from a semifinished spectacle lens with an optically finished surface and a cylinder edge surface, in which a protective film is applied to the optically finished surface, and also to a device for producing a spectacle lens from a spectacle lens blank with at least one optically finished surface, that is to say in particular for producing a spectacle lens from a semifinished spectacle lens, for producing a spectacle lens from a spectacle lens blank with an optically finished surface and a cylinder edge surface, in which a protective film is applied to the optically finished surface.

BACKGROUND

A distinction is made between semifinished spectacle lens products, semifinished spectacle lenses for short, and finished spectacle lens products. In the production industry, finished preliminary products, which are either put into storage for later processing at the same company or are delivered to other companies and produced in the finished state there, are sometimes referred to as semifinished items, articles, or products. Semifinished spectacle lens products or semifinished spectacle lenses are lens blanks with only one optically finished surface (cf. Heinz Diepes, Rolf Blendowske "Optik and Technik der Brille" [Optics and Technology of Spectacles], Optische Fachveröffentlichung GmbH, Heidelberg, 2002, page 560). Finished products (finished articles) is the term used for finished products ready for sale to final customers or spectacle wearers, which are either delivered immediately or are put into storage at the same company for sale later. Finished spectacle lens products or finished spectacle lenses are spectacle lenses with two optically finished optical surfaces. These may be edged or not (cf. ibid., page 559). An edged spectacle lens is therefore a finished spectacle lens that has been brought to the final size and shape by machining the edge (cf. ibid., page 559). DIN EN ISO 13666: 2013-10 defines in subclause 8.4.15 the term remote edging as a process in which raw-edged finished spectacle lenses are edged without the frame being physically present; the tracer data from a database are adopted or the electronically transmitted data are used. Instead of the terms edging or remote edging, the term grinding is also used (see DIN EN ISO 13666: 2013-10 subclause 8.5.1).

The term blanks is often also used to describe unfinished spectacle lenses. Blanks are usually pre-formed pieces of material for the production of spectacle glasses or lenses in any state before the end of the surface machining (cf. ibid.; page 556). The term semifinished blanks is a synonym for the term semifinished products. The terms spectacle lenses and glasses lenses are also used synonymously.

Semifinished spectacle lens products and finished spectacle lens products each have one optical surface intended for the object-side and one for the opposing eye-side arrangement for a spectacle wearer, and a surface spacing them apart. The optical surface intended for arrangement on the object side is referred to as the front surface, the optical surface intended for arrangement on the eye side is referred to as the rear surface. The surface lying in between, either forming an edge directly or indirectly via an edge surface at one end adjoining the front surface and at the other end adjoining the rear surface, is called the cylinder edge surface.

Whereas in the past spectacle lenses were mainly made from mineral glasses, in particular crown glasses (Abbe number >55) and flint glasses (Abbe number <50), spectacle lenses from a variety of organic materials are now available.

At present, semifinished spectacle lens products or finished products with spherical, aspherical, or progressive front surfaces are cast in mass production by means of front and rear surface mold shells and a sealing ring, as described for example in the documents DE 3007572 C2, U.S. Pat. No. 6,103,148 A or JP 2008 191186 A. This applies to materials with the trade names MR-7, MR-8, MR-10, CR-39/CR-607, and others. The materials with the trade names MR-7, MR-8, and MR-10 are polythiourethanes, which are sold by the company Mitsui Chemicals. The abbreviation "MR" here stands for Mitsui Resin. CR-39/CR-607/CR-630 are low refractive index materials with a refractive index of 1.50 that are sold by the company PPG Industries. The materials CR-607 and CR-630 are used for photochromic applications, for example.

Semifinished products or finished products for spectacle lenses of polycarbonate are produced in metal molds by means of injection molding technology. This production method is described for example in EP 0955147 A1.

Order-specific prescription spectacle lenses, i.e., individualized single and multifocal lenses and in particular varifocal or progressive lenses, are brought into their final shape by mechanical processes. Here, the outer forms may have a round, oval, or arbitrary shape, describing so-called free forms.

The semifinished or finished products described above are often subjected to one or more finishing processes. In particular, functional layers are applied to one or both sides. Functional layers of this type are layers which provide the spectacle lenses with predetermined properties that are advantageous for the spectacle wearer, which the spectacle lenses alone would not have on the basis of their material properties and shaping. Apart from optical properties, such as for example anti-reflective coating (see for example EP 0 698 798 A2), mirror coating, light polarization, coloring, etc., such advantageous properties are also mechanical properties, such as hardening (see for example DE 10 2010 048 088 A1), reduction of the attachment of dirt or fogging, i.e., so-called (super-)hydrophobic (see for example DE 10 2012 009 691 A1, DE 10 2015 209 794 A1) or oleophobic properties (in the case of which the surface energy is significantly reduced), increase in diffusivity (see for example DE 10 2013 208 310 A1) etc., and/or electrical properties, such as shielding from electromagnetic radiation, conduction of electrical current, i.e., antistatic properties (see for example EP 1 269 223 A1, DE 10 2010 048 089 A1) etc., and/or other physical or chemical properties.

Functional layers are often applied with the aid of wet coating processes. In production technology, coating is understood as meaning a main group of production processes according to DIN 8580 that are used for applying a firmly adhering layer of formless material to the surface of a workpiece. Wet coating processes are those coating processes in which the initial state of the coating material is liquid. In the production of spectacle lenses, in particular dip-coating processes and spin-coating processes are of particular importance.

Other coating processes are physical or chemical vapor deposition processes, such as for example thermal evaporation, cathode sputtering, etc.

The disclosure relates to the production of a ready-to-use spectacle lens from a semifinished spectacle lens with an optically finished surface with or without a functional layer. This production includes, on the one hand, the step (a) of shaping the surface opposite from the optically finished surface and, on the other hand, the step (b) of edging or remote edging to adapt the cylinder edge to the shape of the frame receiving the ready-to-use spectacle lens. Both machining steps require the spectacle lens blank to be held during the respective machining operations, which are carried out with cutting tools, in particular milling, polishing and grinding tools. The spectacle lens blank is usually held with the aid of a so-called block piece, which is connected to the optically finished surface of the semifinished spectacle lens with the aid of a low-melting metal alloy or a polymeric material. The metal alloy or the polymeric material is applied in a molten state and then hardened, creating a rigid layer of a preselected size and shape that connects the semifinished spectacle lens to the block piece. As an alternative to blocking, it is also known for example to use a double-sided adhesive tape (see for example WO 02/092524 A1).

The semifinished spectacle lens can however also be fixed by means of a vacuum if the radius of curvature of the semifinished spectacle lens corresponds to that of the vacuum receptacle (see for example EP 2 266 754 B1), or by means of wax (see for example DE 2 208 444 A1) or by means of thermoplastic (see for example DE 10 2007 007 161 A1 and DE 2008 022 360 B4) or by means of an adhesive (see for example DE 10 2007 007 161 A1).

To protect the optically finished surface of the semifinished spectacle lens when blocking, essentially two measures are known, specifically (i) the application of a temporary protective layer and/or (ii) the application of a protective film to the optically finished surface of the semifinished spectacle lens before the molten metal alloy or the molten polymer material is applied. The protective layer as well as the protective film must ensure adequate adhesion, which is especially challenging in particular with the high shear forces caused by the mechanical surface and edge machining and with the adhesion-reducing superhydrophobic and/or superoleophobic coating.

WO 00/68326 A1 describes the deposition of a temporary protective layer which is soluble or dispersed with a selective solvent and which protects a plastic spectacle lens from contamination. The temporary protective layer is applied in liquid form and then dried.

WO 02/092524 A1 describes the application of a temporary protective layer that is formed from a material which allows the surface energy of the spectacle lens to be increased with hydrophobic and/or oleophobic properties and which is suitable for being eliminated during a later operation following the remote edging step. According to this document, the temporary protective layer is a mineral layer and in particular a fluoride or a mixture of metal fluorides, an oxide or a mixture of metal oxides. In the description, magnesium fluoride $MgF_2$, lanthanum fluoride $LaF_3$, aluminum fluoride $AlF_3$ and cerium fluoride $CeF_3$ are mentioned as examples of fluorides. Titanium oxide, aluminum oxide, zirconium oxide, and praseodymium oxide are explicitly specified as oxides that can be used. Values between 1 and 50 nm are specified as the typical thickness of such a temporary protective layer made of a mineral material. As an alternative to a temporary protective layer made of a mineral material, the document proposes inks or resins, which represent the binding agent for inks, and which are printed onto the surface of the spectacle lens with a tampon. Alkyd type resins are recommended. Values between 5 and 150 µm are specified as the typical thickness of such a temporary protective layer in the form of an ink or a resin.

WO 2004/110946 A1 describes the application of a 5 to 50 nm thick temporary protective layer made of $MgF_2$. To prevent this protective layer from failing to withstand edge machining if this is not carried out within 48 hours, the document proposes a liquid phase treatment to generate $MgO$ and/or $Mg(OH)_2$ and the subsequent deposition of a non-fluorinated metal oxide or hydroxide, in particular $MgO$ and/or $Mg(OH)_2$.

EP 2 138 271 A1 describes the use of a temporary protective layer of the type described in the aforementioned WO 02/092524 A1. This document recommends the deposition of the temporary protective layer on the hard and anti-reflective coating, subsequent (a) shaping of the surface opposite from the optically finished surface and (b) edging or remote edging to adapt the cylinder edge to the shape of the frame receiving the ready-to-use spectacle lens, blocking and removing the temporary protective layer as well as final application of a final coating from the group of hydrophobic, oleophobic, and antistatic coatings.

The use of a protective film (tape) instead of a temporary protective layer can be found in WO 80/02431 A1. This protective film is an adaptable, multi-layer tape. The protective film comprises a polymeric carrier layer, a pressure-sensitive adhesive on one main surface and a tack-free adhesive layer on the other main surface. The adhesive is a compound or composition of such a nature that it adheres dry (solvent-free), aggressively, and permanently tacky at room temperature to a substrate simply by contact with the finger or hand. The protective film is adaptable or pliable, that is to say follows the curvature of the spectacle lens blanks without creases, air bubbles or other discontinuities. In addition, the protective film is typically translucent, that is to say it allows light to pass through. The protective film should typically not be opaque, however, but may be colored. The protective film described has a 2% secant modulus in the range from approximately 350 to 2000 $kg/cm^2$, a shear value of at least 500 minutes, a 180° peel value in the range between 150 and 750 g/cm width, an elongation at break in the range between 300 and 800%, and an overlap shear value of at least 9 kg/cm'. The protective film should typically have a tensile strength at 100% elongation in the range from approximately 0.2 to 4 kg/cm.

According to WO 80/02431 A1, a large number of adhesives is suitable as pressure-sensitive adhesives. These include polyacrylate adhesives, natural rubber adhesives, and thermoplastic rubber adhesives. An adhesive based on polyacrylate is typical.

After the protective film has been applied to the optically finished surface of the semifinished spectacle lens, the protruding part of the protective film is cut off (see page 13, lines 20 to 21, of WO 80/02431 A1) and the semifinished spectacle lens is then blocked.

WO 97/10923 A1 describes a protective film, also referred to there as a surface protective tape or simply tape, of the type described above. The protective film is adaptable, that is to say follows the bending of the spectacle lens blanks without creases or air bubbles. In addition, the protective film is typically translucent (that is to say it is light-transmissive) and typically also optically clear, so that the spectacle lens blank can be visually aligned before blocking in the suitable device. Colorants (for example dyes and pigments) are in the protective film to improve visibility. In addition, the protective film leaves virtually no adhesive residue behind when it is removed from the spectacle lens. The protective film comprises a polymeric carrier layer, a pressure-sensitive adhesive on one main surface and a tack-free adhesive layer on the other main surface. The total thickness of the polymeric carrier is between 0.01 and 0.25 mm. After the application, excess tape is cut off from the edge of the spectacle lens blank (see page 22, last paragraph). Then the spectacle lens blank is blocked.

WO 97/10924 A1 likewise describes a protective film of the type described in WO 80/02431 A1 and of the type described in WO 97/10923 A1.

JP 60135167 A2 also describes a protective film for a lens. The protective film comprises a transparent or opaque resin film and may be provided with a pressure-sensitive adhesive on one or both sides. The protective film serves to protect the lens from damage caused by markings, guide lines or the like that are applied to the optical center of the lens or around it, and from damage caused by a suction cup placed on the center of the lens.

EP 0 285 490 A1 describes a device and a method for applying a protective film of the type described in documents WO 80/02431 A1, WO 97/10923 A1, WO 97/10924 A1 to the optically finished surface of a semifinished spectacle lens. The method described using the device comprises the steps $x_1$) arranging a spectacle lens on a carrier, $x_2$) unwinding a roll of a protective film tape having an adhesive surface and a peelable strip lying over the adhesive surface, $x_3$) separating the peelable tape strip, $x_4$) punching a hole with a predetermined diameter larger than that of the spectacle lens in the peel-off tape separated from the adhesive tape, $x_5$) grouping the punched peel-off tape and the adhesive tape such that a round part thereof is formed and the adhesive surface of the adhesive tape remains free through the hole of the punched peel-off strip, where $x_6$) the punched peel-off tape and the adhesive tape are passed between the carrier and a supporting cushion, where $x_7$) the exposed portion of the adhesive surface of the adhesive tape is applied to one side of the spectacle lens through relative movement of the carrier and the cushion toward each other, $x_8$) cutting off the adhesive tape around the circumferential edge of the spectacle lens, $x_9$) evacuating the spectacle lens with the cut-out portion of the adhesive strip so that it sticks to the surface of the spectacle lens and forms the protective film, $x_{10}$) evacuating the remaining cut-out portion of the tape and the perforated peel-off tape and then repeating steps $x_1$) to $x_{10}$). The semifinished spectacle lens provided with a protective film in this way is then blocked and the blocked semifinished spectacle lens is passed on to the aforementioned machining steps (a) and (b).

Although protective films of the aforementioned type have in principle proven to be suitable for the application described above, there is still need for improvement. In particular, it has been found that the optically finished surface of the spectacle lens blank, in particular its applied functional layers, is damaged after removal of the protective film or fails due to adhesion problems (detachment and/or warping/creases).

SUMMARY

It is an object of the disclosure to provide a spectacle lens blank in which a protective film is applied to an optically finished surface, in the case of which the occurrence of damage after removal of the protective film is reduced. A further object of the disclosure is to provide a production method and a corresponding production device for a spectacle lens in which a spectacle lens blank with an optically finished surface to which a protective film has been applied is taken as a basis, in the case of which the occurrence of damage to the optically finished surface, in particular those with functional layers, is reduced.

This object is achieved by a spectacle lens blank with an optically finished surface and a cylinder edge surface, in which a protective film is applied to the optically finished surface, a method for producing a spectacle lens blank with an optically finished surface and a cylinder edge surface, in which a protective film is applied to the optically finished surface, and a device for producing a spectacle lens blank with an optically finished surface and a cylinder edge surface, in which a protective film is applied to the optically finished surface. Exemplary embodiments and developments of the disclosure are discussed below.

The disclosure is based on a spectacle lens blank with an optically finished surface and a cylinder edge surface and with a protective film on the optically finished surface. In this context, a spectacle lens blank is either a semifinished product or a finished product. The spectacle lens blank may therefore have one or two optically finished surfaces. Either the front surface of the spectacle lens blank or the rear surface may thus be optically finished or both surfaces, that is to say the front and rear surfaces. In this context, an optically finished surface is a surface that has at least the final shape. It may but does not have to have one or more functional layers of the type described in the introductory part of the description. One or more functional layers may therefore be applied at a later point in time. Often, in particular for the reasons described in the documents cited in the introductory part of the description, the convexly curved front surface is the optically finished surface. According to the introductory part of the description, a protective film is understood as meaning a film which has at least on one side of a carrier made of plastic or the like an adhesive substance with which this film can under certain pressure be detachably connected to the previously described spectacle lens surfaces, as described in the aforementioned documents WO 80/02431 A1, WO 97/10923 A1, WO 97/10924 A1, EP 0 285 490 A1, and JP 60135167 A2. The documents cited describe a number of carrier materials. The carrier, which is typically made of a polymeric material, has a total thickness of between 0.01 and 0.25 mm. The adhesive substance usually comprises a pressure-sensitive adhesive. According to the documents cited above, a large number of adhesives are suitable as pressure-sensitive adhesives. These include polyacrylate adhesives, natural rubber adhesives and thermoplastic rubber adhesives. An adhesive based on polyacrylate is typical. The protective layer should meet the requirements mentioned in the introductory part of the description. In particular, it must absorb the forces during the machining of the opposite and edge surfaces, protect the optically finished surface from contamination, and allow itself to be removed again without leaving any residue.

The protective film disclosed herein can be arranged not only on the optically finished surface, but also on the cylinder edge surface. The protective film may cover the optically finished surface completely or only to a certain extent. This also applies to the cylinder edge surface. The covering of at least part of the cylinder edge surface with the adhesive protective film, in particular in the transitional area between the optically finished surface and the cylinder edge surface, prevents damage-causing or damage-promoting moisture or ambient air from being able to penetrate into the functional layer stack or into the "space" between the protective film and the optically finished surface.

This is so because it has been found that the adhesion on the "raw" cylinder edge is significantly better than on the optically effective front or back surface of the spectacle lens, because the surface quality from the casting, but sometimes also from centering, is significantly better for this purpose. In addition, the boundary surface between the "end of the protective film (tape) and the atmosphere" is not on the front or rear surface, which represents an optically effective surface, but, when used as intended, on the optically unused cylinder edge. It has been found that, if a so-called residual adhesive transfer of the protective film occurs after the protective film has been detached from the spectacle lens (blank), this always occurs at the edge for the first 0.5 to 3 mm. If, as is customary in the related art, the protective film is only applied to the optically effective surface, then there are often adhesive residues on the optically effective surface. If the protective film partially covers the cylinder edge, the boundary surface is located at the cylinder edge and there are no adhesive residues on the optically effective front (or possibly rear) surface.

The corresponding method for producing a spectacle lens from a spectacle lens blank with an optically finished surface and a cylinder edge surface, in which a protective film is applied to the optically finished surface, is characterized according to the disclosure in that the protective film is also applied to the cylinder edge surface.

The device corresponding to the method for producing a spectacle lens from a spectacle lens blank with an optically finished surface and a cylinder edge surface, in which a protective film is applied to the optically finished surface, is characterized according to the disclosure in that it has an application device to also apply the protective film to the cylinder edge surface. The object set at the beginning is fully achieved by the measure according to the disclosure described above with regard to the spectacle lens blank as well as with regard to the production method and the production device.

An exemplary embodiment of the disclosure provides that the protective film is arranged along the entire circumference of the cylinder edge surface. In other words, in the production method according to the disclosure the protective film is applied to the cylinder edge surface along the entire circumference. The entire transitional area between the optically finished surface and the cylinder edge surface is thus protected from the damage-causing or damage-promoting surroundings.

Another exemplary embodiment of the disclosure provides that the protective film, starting from a peripheral boundary line at which the cylinder edge surface adjoins the optically finished surface, is arranged over a minimum dimension from the following group:
(i) 0.5 mm,
(ii) 1 mm,
(iii) 2 mm,
(iv) half the cylinder edge height, and
(v) the entire cylinder edge height
on the cylinder edge surface. According to this exemplary embodiment, the production process includes the process step that the protective film, starting from a peripheral boundary line at which the cylinder edge surface adjoins the optically finished surface, is applied over a minimum dimension from the following group:
(i) 0.5 mm,
(ii) 1 mm,
(iii) 2 mm,
(iv) half the cylinder edge height, and
(v) the entire cylinder edge height
to the cylinder edge surface. The cylinder edge height is the dimension between the outer edge (boundary line) of the optically finished surface on which the protective film is attached and the outer edge (boundary line) of the opposite surface. Since the protective film is usually applied to the convex front surface, the opposite surface is the rear surface. An application over the entire height of the cylinder edge means that the cylinder edge is completely covered with the protective film. A minimum dimension of 0.5 mm has been found to be advantageous to establish a detachable but permanent connection between the protective film and the cylinder edge. Smaller minimum dimensions may lead to the protective film becoming detached automatically due to its limited elasticity.

The adhesion to the "raw" cylinder edge—as already stated above—is significantly better, because the surface quality from the casting but sometimes also from the centering is significantly better. The "end of the tape to atmosphere" boundary surface is not on the optically effective surface, but also on the edge of the cylinder. It has been found that if there is residual adhesive transfer from the film, then always at the edge to the first 0.5 to 3 mm. If the boundary surface is at the edge, there are no adhesive residues on the optically effective surface.

Another exemplary embodiment of the disclosure is that the protective film has a temporary marking. A temporary marking means that it can be removed by manual wiping with the aid of a solvent, without impairing the protective effect of the protective film itself for the surface of the spectacle lens blank lying below. A temporary marking is in particular a marking in the form of a stamp in the sense of subclause 14.2.13 of DIN EN ISO 13666: 2013-10.

In order to produce a crease-free, bubble-free and discontinuity-free connection between the protective film and the optically finished surface as well as the cylinder edge surface, in a particularly advantageous exemplary embodiment of the method according to the disclosure it has been found to be advantageous if the protective film is applied to the optically finished surface and the cylinder edge surface at a temperature elevated with respect to room temperature. In particular, the following temperature ranges have been found to be recommendable: Application of the protective film at a temperature of the protective film from the group:
(i) between 450° C. and 85° C.,
(ii) between 50° C. and 80° C.,
(iii) between 55° C. and 75° C., (iv) between 60° C. and 70° C.,
(v) between 62° C. and 68° C., and
(vi) between 64° C. and 66° C.

to the optically finished surface and the cylinder edge surface. This is so because the production of a crease-free, bubble-free and discontinuity-free connection between the protective film and the optically finished surface and the cylinder edge surface requires sufficient elasticity of the carrier of the protective film to be able to cling to the solid surfaces of the spectacle lens blank. To achieve this elasticity, an increase in the temperature of the protective film compared to the surrounding room temperature is necessary. However, the chosen temperature must not lead to the destruction of the protective film or to the destruction of the spectacle lens blank. It has been found that temperatures around 60° C. best meet both requirements. The temperature of the protective film can be increased for example with the aid of a hot air blower, which heats the protective film in the area of the application surface. The heating or warm air fan may be arranged on one side or on both sides of the protective film. Heating by the heating or warm air fan may therefore take place only from the side of the protective film facing away from the spectacle lens surface, from the side facing the spectacle lens surface, or from both sides. Alternatively, it is also possible to use a radiant heater, for example an infrared heater, which is arranged on the side of the protective film facing away from the spectacle lens surface. Insofar as the protective film is unrolled from a tape and applied to the spectacle lens surfaces and cut to size, as described, for example, in EP 0 285 490 A1, local heating in the area of the application surface is sufficient.

In a variant of this exemplary embodiment, it is helpful if the protective film is applied to the optically finished surface and the cylinder edge surface with the aid of a mechanical mold part. Such a mechanical mold part may be a stamp, as is described in EP 0 285 490 A1, for example. The stamp may have a hollow-cylindrical shape, which is designed to be complementary to the surface geometry of the spectacle lens surfaces to which the protective film is applied. Overall, the application device may be identical or similar to the apparatus described in EP 0 285 490 A1 and shown there in the drawings. It is also possible that the application device is designed in the manner of a roller, which is guided rolling over the spectacle lens surfaces. The roller may for example be rotatably mounted on a rigid axle. The roller may have a resilient surface similar to a sponge or a rubber.

Another exemplary embodiment of the method according to the disclosure and the associated device is that the protective film is applied with the aid of an negative atmospheric pressure between the protective film and the optically finished surface and/or the cylinder edge surface. In the context of the present disclosure, negative atmospheric pressure should be understood as meaning an air or ambient gas pressure below the natural air pressure, which corresponds approximately to 1013 hPa. This measure achieves the effect that the heated protective film clings to the surfaces of the spectacle lens in a crease-free, bubble-free, and discontinuity-free manner.

A crease-free, bubble-free and discontinuity-free application of the protective film is possible at a pressure in the range between (i) 10 and 1000 hPa. Typical pressure ranges are, in order of increasing particularity:
(ii) between 100 and 900 hPa,
(iii) between 200 and 800 hPa,
(iv) between 300 and 700 hPa, and
(v) between 400 and 600 hPa.

A negative pressure on the spectacle lens side of the protective film opposite the side of the protective film opposite from the spectacle lens side can be produced with commercially available vacuum pumps.

In order to prevent or at least reduce contamination, and in particular the adhesion of undesired substances, through contact of the optically finished surface and the applied functional layer stack with the ambient atmosphere, it has been found to be advantageous to apply the protective film within a period of time from the group:
(i) less than 72 hours,
(ii) less than 48 hours,
(iii) less than 24 hours,
(iv) less than 12 hours,
(v) less than 6 hours,
(vi) less than 3 hours,
(vii) less than 1 hour, and
(viii) less than 30 minutes after completion of the optically finished surface. The specified periods of time are again given in the order of increasing preference, taking into account the climatic conditions and in particular also seasonal fluctuations.

According to the related art, it is generally customary to place semifinished plastic products in a plastic tray after they have been cast and then to pack them in a folding box. Alternatively, it is also known according to the related art to wrap semifinished plastic products in a soft piece of plastic similar to cloth or packing paper, or in a foamed plastic film (so-called "foam wrap") or a plastic deep-drawn insert (so-called "plastic cup") before they are packed in the folding box. The semifinished products packed in this way are then sent to the prescription workshops. This process is time-consuming and personnel-intensive and therefore causes considerable costs. The disclosure therefore provides for the spectacle lens blank with the applied protective film to be packed directly without any further packaging material, in particular in an outer packaging such as a folding box, tube, or deep-drawn tray, and to dispense with the additional wrapping steps specified above.

The spectacle lens blank with the already applied protective film packed in this way is then advantageously dispatched according to the disclosure.

In a consistent manner, it is then advantageous if the spectacle lens blank packed in this way is unpacked after reaching its destination (for example in the prescription workshop), that the unpacked spectacle lens blank is blocked on the protective film (for example in the prescription workshop) and/or is provided with a temporary marking (for example in the prescription workshop or at the place where the semifinished product is produced).

In a further exemplary embodiment of the method according to the disclosure, it is provided that the blocked spectacle lens blank is subjected to at least one machining step from the following group, specifically:
(i) shaping the surface opposite from the optically finished surface,
(ii) applying at least one functional layer to the opposite shaped surface,
(iii) applying a temporary marking to the protective film,
(iv) applying an identification code,
(v) edging or remote edging of the cylinder edge surface to adapt the cylinder edge to a shape of a frame receiving a ready-to-use spectacle lens,
(vi) blocking,
(vii) removing the protective film, and
(viii) applying at least one functional layer to the optically finished surface after removing the protective film.

BRIEF DESCRIPTION OF THE DRAWINGS

The disclosure will now be described with reference to the drawings wherein:

FIGS. 6.1, 6.2, and 6.3 show an exemplary embodiment of an application of a protective film according to the disclosure as part of a method for producing a spectacle lens from a spectacle lens blank with an optically finished surface and a cylinder edge surface.

DESCRIPTION OF EXEMPLARY EMBODIMENTS

Figure 1A:
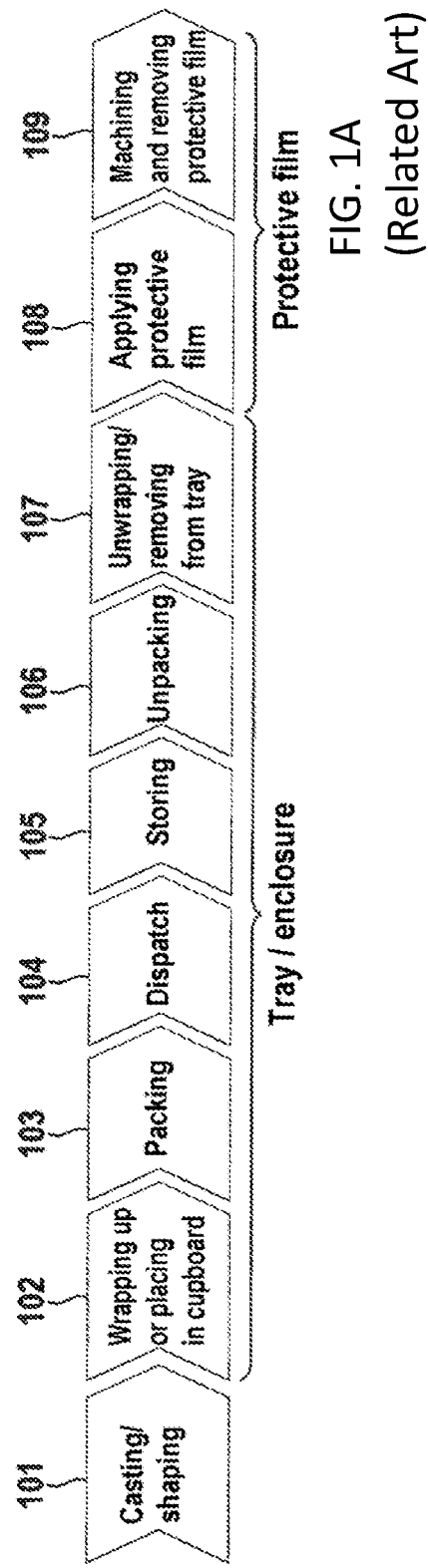
FIG. 1A shows the production of a spectacle lens with the process steps according to the related art.
Figure 1C:
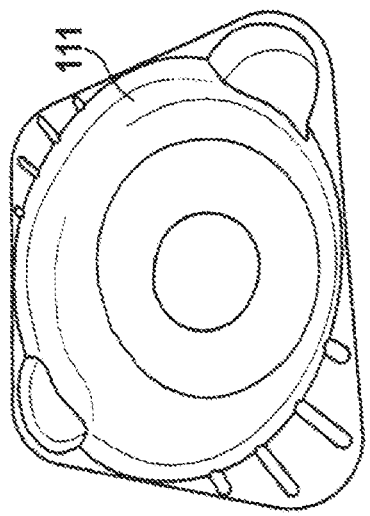
FIG. 1C shows the tray packing according to the related art.
Figure 1B:
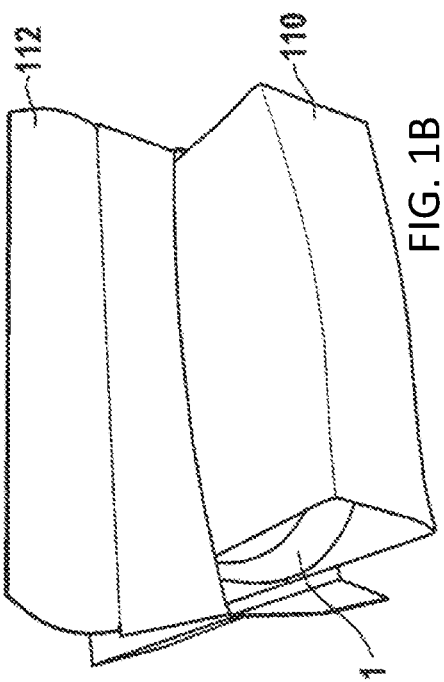
FIG. 1B shows the wrap packing according to the related art.
Figure 1D:
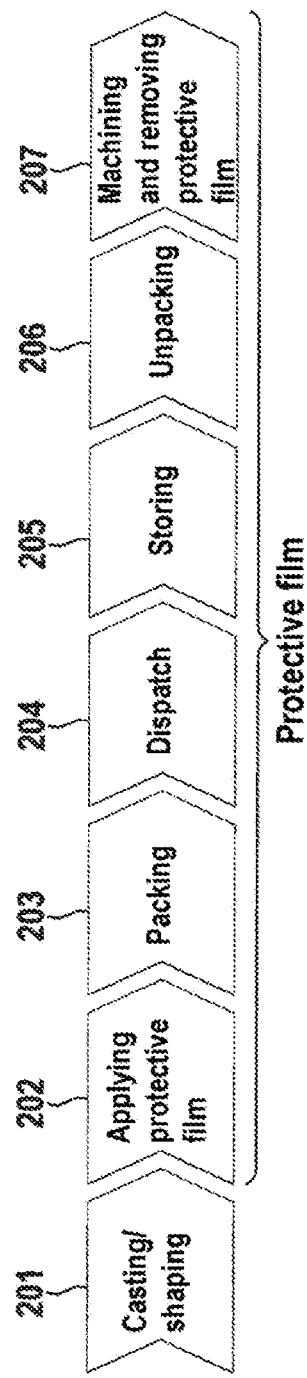
FIG. 1D shows the process steps according to the disclosure.
Figure 1E:
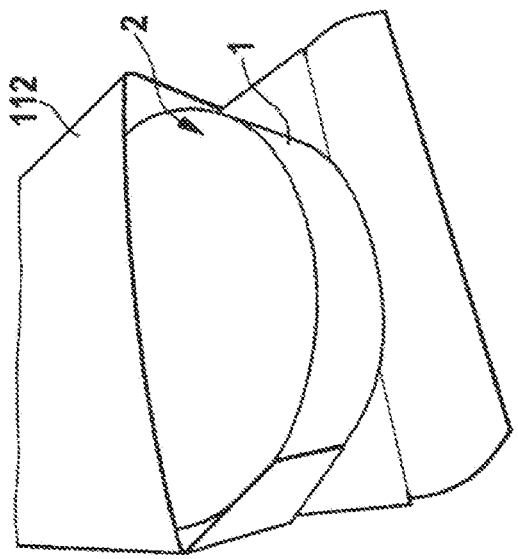
FIG. 1E shows the folding box packing of a spectacle lens blank with a protective film according to the disclosure.

FIGS. 1A through 1C show the production of a spectacle lens according to the related art in comparison with the production of a spectacle lens according to the disclosure, as shown in FIGS. 1D and 1E. FIG. 1A shows the typical process steps of the production method according to the related art. In a first step 101, a semifinished product 1 is cast. The convex front surface usually already has its optically finished surface geometry. Various functional layers may be applied, as already described in the introductory part of the description. Thereafter, in a step 102, the semifinished product 1 is either wrapped with a wrapping film 110 of the type shown in FIG. 1B or placed in a plastic tray 111 of the type shown in FIG. 1C. After the wrapping or insertion, the packing in a folding box 112 follows in a step 103. Dispatch then takes place from the place where the lens is cast, for example to a prescription workshop (step 104). The folding box 112 with the spectacle lens blank 1 is stored there (step 105) until it is needed for further processing. Then, in a step 106, unpacking from the folding box 112 and, in a further step 107, the unwrapping or removal from the plastic tray 111 takes place. According to the related art, in a further step 108, a protective film 2 of the type described in detail in the introductory part of the description is then applied. Then the machining of the (prescription) surface opposite from the optically finished surface and the edge machining take place according to process steps (a) and (b) specified in the introductory part of the description. The time during which the protective film is applied to the semifinished product is usually between 0.1 and 2 hours.

In comparison with the representation according to FIG. 1A, FIG. 1D shows the process steps of the production method according to the disclosure. Process steps 101, 103, 104, 105, and 106 as well as 109 can be found in a corresponding manner. These process steps are indicated in FIG. 1D by the reference numerals 201, 203, 204, 205, and 206, as well as 207. Process step 102 as such is omitted in the production method according to the disclosure. Process step 108 takes place (in a form modified according to the disclosure, as described below) instead of process step 102 in the chronological order, and is therefore identified in FIG. 1D by reference numeral 202.

The state of the spectacle lens blank 1 in the folding box 112 in process step 203 is shown in FIG. 1E. The folding box packing here thus encloses a spectacle lens blank 1 with a protective film 2 according to the disclosure.

In the case of the method according to the disclosure, the time during which the protective film 2 is applied to the semifinished product 1 is between one day and, if necessary, several weeks, up to 6 months in the case of so-called freeform semifinished spectacle lenses, and up to a year in the case of cast varifocal semifinished products. Commercially available protective films, such as for example DAC Vision ST-4004, Satisloh Superstick, Lohmann DuploColl 21393, and VigTeQnos Z-6294, can be easily removed again even after this comparatively long application period.

Figure 2:
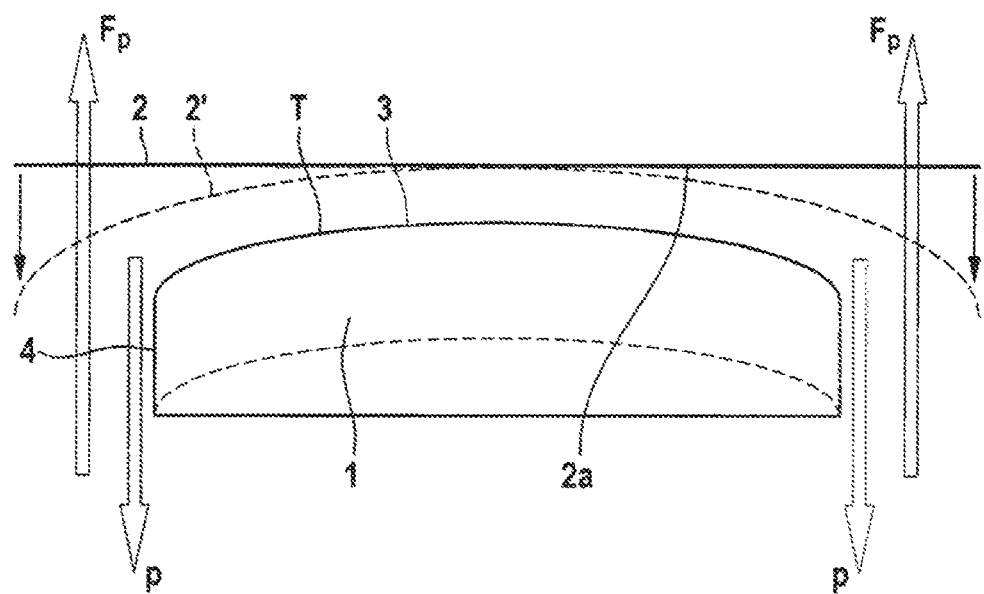
FIG. 2 shows the application of a protective film according to the disclosure to a spectacle lens blank.

FIG. 2 shows a device and a method for applying a protective film 2 according to the disclosure to a spectacle lens blank 1, in particular a semifinished product 1. The protective film 2 is moved relative to the semifinished product 1 in the direction of its optically finished front surface 3. At the same time, the area between the front surface 3 and protective film 2 is evacuated, which is indicated by the symbol p. Specifically, p denotes a (negative) pressure with respect to the atmospheric pressure prevailing above the protective film 2. This creates a compressive force $F_p$, which presses the protective film 2 onto the front surface 3 of the semifinished product 1. An increased temperature T of approximately 60° C.-70° C. of the front surface 3 of the semifinished product and/or the protective film 2 in the area of the application surface and the acting compressive force $F_p$ achieve the effect that the protective film 2 is plastically deformed and clings to the front surface 3 of the semifinished product and the cylinder edge surface 4 in a crease-free, bubble-free, and discontinuity-free manner. The plastic deformation of the protective film 2 is indicated in the drawing by the reference numeral 2'. The pressure-sensitive adhesive 2a on the side of the protective film 2 facing the front surface 3 of the semifinished product 1 ensures a detachable connection between the front surface 3 of the semifinished product and the protective film 2 and between the cylinder edge surface 4 and the protective film 2.

Figure 3A:
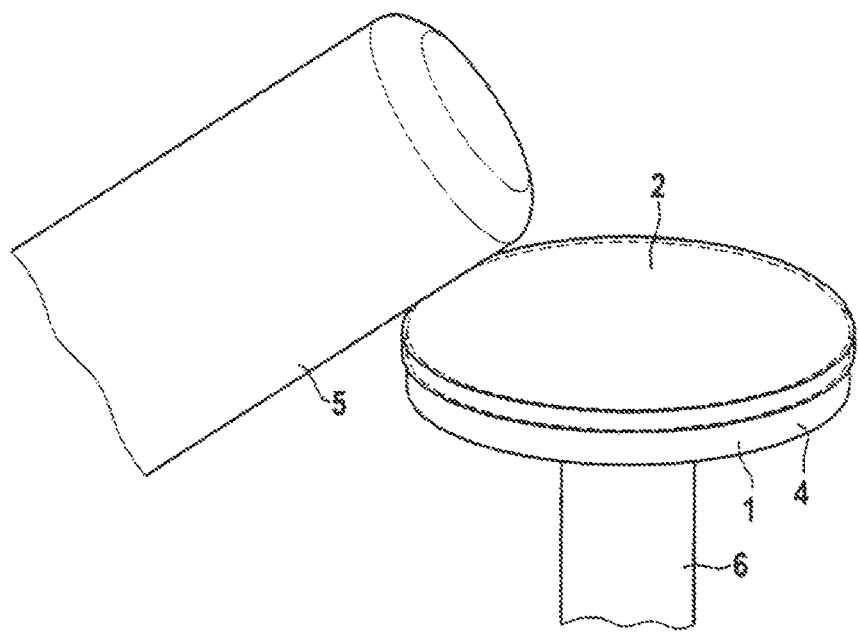
FIG. 3A shows an application device according to the disclosure in the form of a roller with a sponge-like foam surface applying the protective film to the optically finished surface of a spectacle lens blank.
Figure 3B:
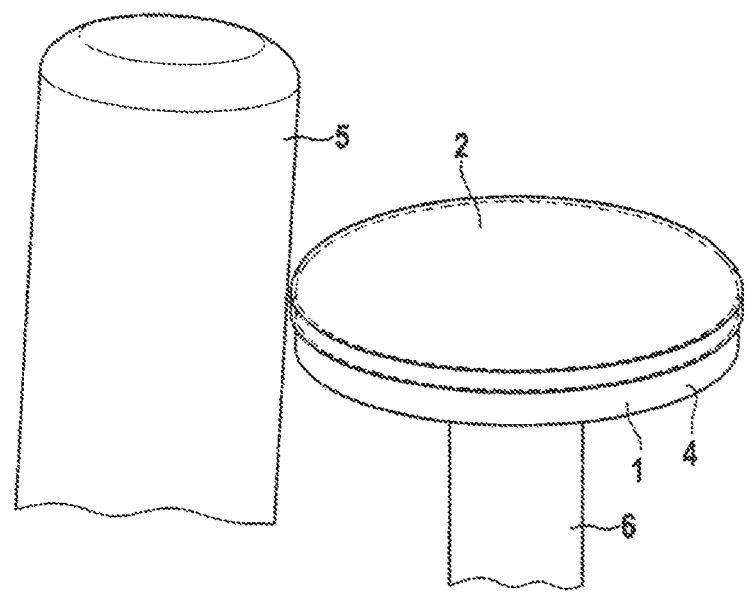
FIG. 3B shows an application device according to the disclosure in the form of a roller with a sponge-like foam surface applying the protective film to the cylinder edge surface of the spectacle lens blank.

To apply the protective free from creases and bubbles over the full surface area, a roller 5 may be guided over the front surface 3 and the cylinder edge surface 4 of the semifinished product 1 resting on a holder 6, with the application of force to the protective film 2 lying on said surfaces, as shown in FIGS. 3A and 3B. FIGS. 3A and 3B specifically show an application device according to the disclosure in the form of a roller 5 with a sponge-like foam surface, wherein FIG. 3A shows the application of the protective film 2 to the optically finished surface 3 of the spectacle lens blank 1 and FIG. 3B shows the application of the protective film 2 on the cylinder edge surface 4 of the spectacle lens blank 1.

Figure 4A:
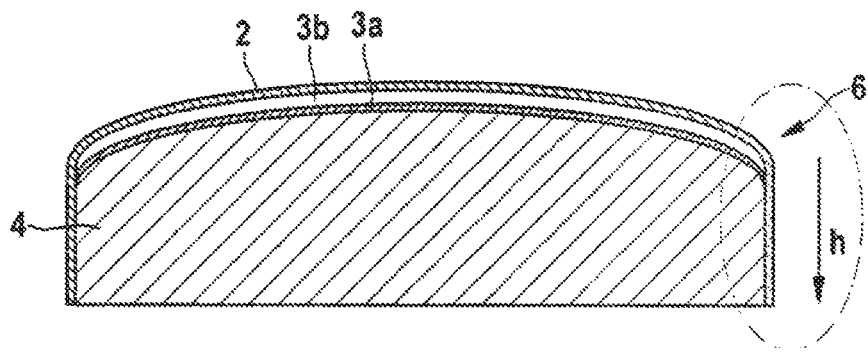
FIG. 4A shows a spectacle lens blank with an applied protective film according to the disclosure in cross section of a spectacle lens blank with a protective film applied to an optically finished surface and to the cylinder edge surface.

A spectacle lens blank 1 with a protective film 2 applied according to the disclosure can be seen in cross section in FIG. 4A. The protective film 2 is a protective film 2 applied fully on the optically finished surface 3 of the spectacle lens blank 1 and over the entire extent of its height h on the cylinder edge surface 4. It can be seen from FIG. 4A that the optically finished surface 3 bears so-called functional layers 3a and 3b. In this exemplary embodiment, 3a is indicates the existence of a hard coating and 3b indicates the presence of an anti-reflective coating. Although in the example shown the entire cylinder edge surface 4 is covered with the protective film 2, this does not necessarily have to be the case according to the disclosure. In particular, there may also only be an adhesive covering by the protective film 2 from a peripheral border line 6 between the surfaces 3 and 4 up to a partial height $h_t$ of for example approximately 1 mm.

Figure 4B:
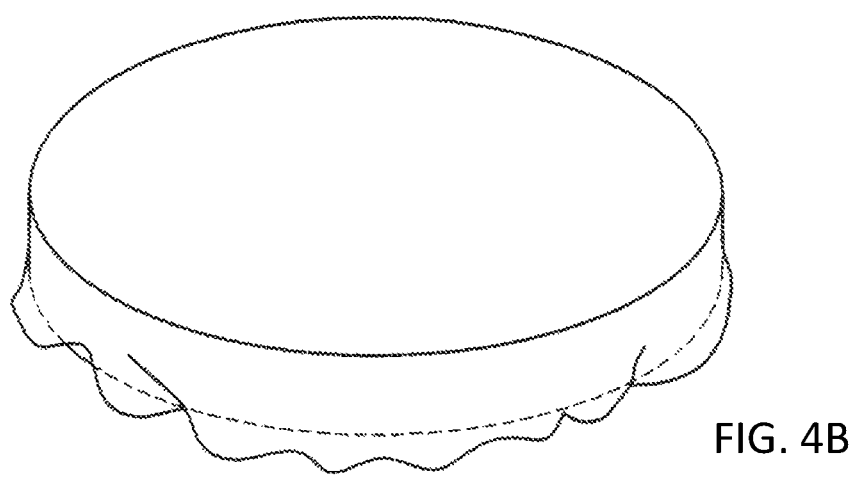
FIG. 4B shows a spectacle lens blank with an applied protective film according to the disclosure in perspective representation in which the protective film was applied at a temperature of 40° C.
Figure 4C:
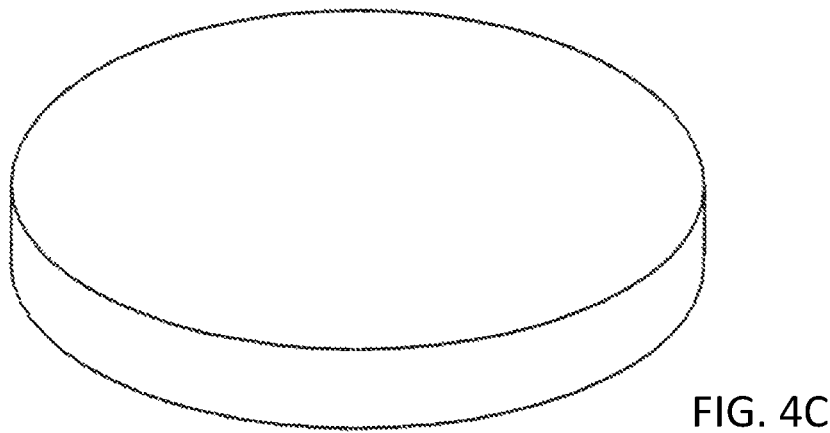
FIG. 4C shows a spectacle lens blank with an applied protective film according to the disclosure in perspective representation in which the protective film was applied at a temperature of 60-70° C.

A non-schematic perspective representation of a spectacle lens blank 1 in which the protective film 2 was applied at a temperature of 40° C. can be seen in FIG. 4B. For comparison, FIG. 4C shows a perspective representation of a spectacle lens blank 1 in which the protective film 2 was applied at a temperature of 60-70° C. While the protective film 2 applied at 60-70° C. is free from bubbles, creases and discontinuities both in the cylinder edge area 4 and on the front surface 3, the protective film 2, which was applied at a lower temperature, exhibits creases, particularly in the cylinder edge area 4.

Figure 5A:
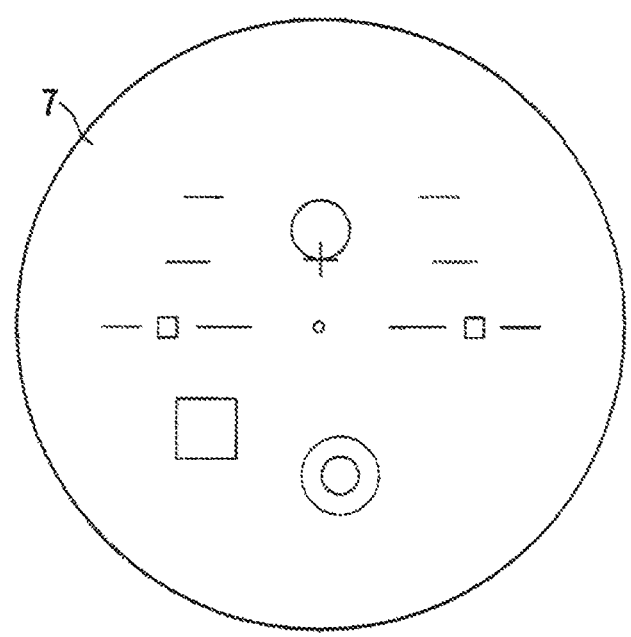
FIG. 5A shows a spectacle lens blank with a protective film applied according to the disclosure in perspective representation having centering and grinding markings applied with the aid of an inkjet printer.
Figure 5B:
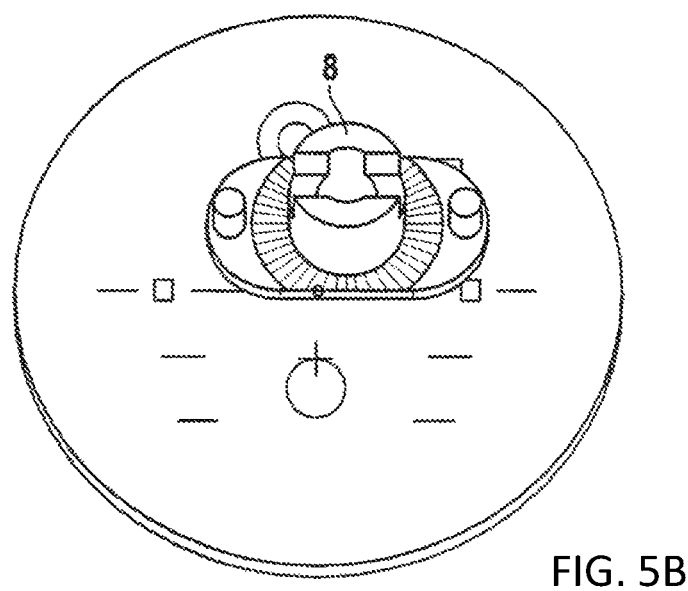
FIG. 5B shows a spectacle lens blank with a protective film applied according to the disclosure in perspective representation having centering and grinding markings applied with the aid of an inkjet printer and an attached block piece.

FIGS. 5A and 5B show spectacle lens blanks with a protective film applied according to the disclosure. The perspective representation of a spectacle lens blank with a protective film applied according to the disclosure shown in FIG. 5A shows centering and grinding markings 7 applied with the aid of an inkjet printer. The perspective representation in FIG. 5B shows a spectacle lens blank with a protective film applied according to the disclosure and centering and grinding markings applied with the aid of an inkjet printer, as well as an attached block piece 8.

FIGS. 6.1, 6.2, and 6.3 show an exemplary embodiment of an application according to the disclosure of a protective film 2 when producing a spectacle lens from a spectacle lens blank 1 with an optically finished surface 3 and a cylinder edge surface 4.

The application or taping process comprises the following process steps: In a first method step 601, the protective film 2 is fed in the form of a tape via a roller conveyor 61 with a plurality of holding devices 61a, 61b, 61c, 61d. In the area of the spectacle lens blank 1, the protective film 2 is heated to approximately 60-70° C., which is identified in FIG. 6.1 by the reference numeral 62.

In a further working step 602, a lifting mechanism 63 lifts the holder 6, and thus the spectacle lens blank 1, so that its finished surface 3 comes into contact with the side of the protective film 2 that has an adhesive substance, so that it smoothly clings to the finished surface 3. A vacuum 65 is applied to the space 64 between the protective film 2 and the surface 3, helping to achieve smooth clinging to the finished surface 3 and preventing formation of air pockets between the protective film 2 and the surface 3.

Blades 66 separate the protective film 2 in the area of the holding devices 61a, 61b, 61c, and 61d. Due to the force of gravity and the vacuum 65, the protective film 2 also rests against the cylinder edge surface 4 of the spectacle lens blank 1 (method step 603).

In order to achieve bubble-free contact of the protective film 2 also in the area of the cylinder edge surface 4, as indicated in process step 604, it is necessary to take measures, which can optionally be carried out by at least one of the substeps 605a to 605g in FIGS. 6.2 and 6.3.

In substep 605a, compressed air 67 may be applied to the adhesive-free surface of the protective film 2 via one or more compressed air nozzles 68. As a result, the protective film 2 is pressed onto the effective surface 3 and the cylinder edge surface 4.

The protective film 2 in the area of the peripheral edge 9 is pressed against the effective surface 3 and the cylinder edge surface 4 via one or more rotatingly driven (reference numeral 70 indicates the rotational movement) rollers 69, the angle of attack of which in the example can be varied over a range between 45° and 90°. The reference numeral 69 shows the rollers with an angle of attack of 90°, the reference numeral 69' shows the rollers with an angle of attack of 45°. The movement of the rollers 69 here always takes place in the radial direction with respect to the center axis of the spectacle lens blank 1.

In process substep 605c, rollers 71 are rotatingly guided in an axial direction with respect to the center axis of the spectacle lens blank 1 along the cylinder edge surface 4 (direction of rotation 72) and are thereby pressed against it (direction of pressure 73).

In process substep 605d, two half-shells 74, 75 are pressed together in a form-fitting manner, enclosing the cylinder edge surface 4 (reference numerals 76, 77). At the same time, hot air and/or ultrasound may be applied to the cylinder edge surface 4, which leads to bubble-free and discontinuity-free contact and adhesion of the protective film 2 to the cylinder edge surface 4.

Process substep 605e shows a variant in which the spectacle lens blank 1 is guided in the direction 80 on a belt conveyor 78. During transport in the direction 80, the cylinder edge surface 4 of the spectacle lens blank 1 comes into contact with rollers 79, which roll on the cylinder edge surface 4 of the spectacle lens blank 1 (direction of rotation 81), which leads to a bubble-free and discontinuity-free contact and adhesion of the protective film 2 to the cylinder edge surface 4.

Process substep 605f shows a similar variant in which the spectacle lens blank 1 is likewise guided on a belt conveyor 82 in the direction 83. In this variant, the spectacle lens blank 1 does not lie with the side opposite from the finished surface 3 on the belt of the belt conveyor, as in the variant according to 605e, but with the cylinder edge surface 4. A wall surface 84 opposite from the running belt of the belt conveyor 82 and the spectacle lens blank serves as a contact surface during transport in the direction 83 and, together with the running belt surface, ensures that the protective film is pressed against the cylinder edge surface 4. At the same time, hot air and/or ultrasound may be applied to the cylinder edge surface 4, which leads to bubble-free and discontinuity-free contact and adhesion of the protective film 2 to the cylinder edge surface 4.

Process substep 605g shows the application of a second protective film 2a to the protective film 2 in the area of the cylinder edge surface 4 of the spectacle lens blank 1, which results in a watertight seal.

An exemplary embodiment of the disclosure is summarized as follows:

The "warm application" of the protective film at a surface temperature of approximately 60-70° C. is recommendable. For the best possible results, a device with adjustable temperature, vacuum, substrate pressure against the protective film, substrate movement, and application time is required.

Since the aforementioned commercially available protective films have acrylic adhesives, they are all sensitive to humidity. Storage of semifinished products provided with protective films under "hot and humid" conditions for a long time (up to a year) can lead to reduced adhesion performance. That is why typical further processing within a few months is recommendable.

The surface machining (opposing surface and cylinder edge surface) is ensured with sufficient reliability for base curves between BC 0.5 and 10 according to the processes presented above with the aforementioned commercially available protective films.

Inkjet printing is possible on the surface provided with the protective film. A wipe test shows that the ink remains reliably on the surface.

Identification code (barcode/data matrix code/quick response) on the protective film for clear identification by means of inkjet printing processes.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A spectacle lens blank comprising:
   an optical front surface configured for an object-side arrangement for a spectacle wearer and being optically finished;
   an optical rear surface configured for an opposing eye-side arrangement for the spectacle wearer;
   a cylinder edge surface arranged between the optical front surface and the optical rear surface, wherein the cylinder edge surface is configured to either form an edge directly or indirectly via adjoining the optical front surface at one end of the cylinder edge surface and adjoining the optical rear surface at another end of the cylinder edge surface; and
   a protective film arranged on the optical front surface and also on at least a portion of the cylinder edge surface, wherein the protective film has on a side facing the optical front surface of the spectacle lens blank a pressure-sensitive adhesive, which is configured as a detachable connection between the optical front surface and the protective film and between the cylinder edge surface and the protective film, and
   wherein the cylinder edge surface has a circumference and the protective film is arranged on the cylinder edge surface along substantially an entirety of the circumference.

2. The spectacle lens blank as claimed in claim 1, wherein the protective film is arranged on the cylinder edge surface along the entirety of the circumference.

3. The spectacle lens blank as claimed in claim 1, wherein the cylinder edge surface has a cylinder edge height and the protective film, starting from a peripheral boundary line at which the cylinder edge surface adjoins the optically finished surface, is arranged over a minimum dimension selected from the group consisting of:
   (i) 0.5 mm,
   (ii) 1 mm,
   (iii) 2 mm,
   (iv) half the cylinder edge height, and
   (v) the entire cylinder edge height,
   on the cylinder edge surface.

4. The spectacle lens blank as claimed in claim 1, wherein the protective film has at least one of a temporary marking and an identification code.

5. A method for producing a spectacle lens from a spectacle lens blank, the method comprising:
   providing a spectacle lens blank having:
   an optical front surface configured for an object-side arrangement for a spectacle wearer and being optically finished;
   an optical rear surface configured for an opposing eye-side arrangement for the spectacle wearer; and
   a cylinder edge surface arranged between the optical front surface and the optical rear surface, wherein the cylinder edge surface is configured to either form an edge directly or indirectly via adjoining the optical front surface at one end of the cylinder edge surface and adjoining the optical rear surface at another end of the cylinder edge surface;
   applying a protective film to the optical front surface;
   applying the protective film also to a portion of the cylinder edge surface, wherein the protective film has on a side facing the optical front surface of the spectacle lens blank a pressure-sensitive adhesive, which is configured to provide a detachable connection between the optical front surface and the protective film and between the cylinder edge surface and the protective film, wherein the cylinder edge surface has a circumference; and
   applying the protective film to the cylinder edge surface along substantially an entirety of the circumference.

6. The method as claimed in claim 5, further comprising:
   applying the protective film to the cylinder edge surface along the entirety of the circumference.

7. The method as claimed in claim 5, wherein the cylinder edge surface has a cylinder edge height and the protective film, starting from a peripheral boundary line at which the cylinder edge surface adjoins the optically finished surface, is applied over a minimum dimension selected from the group consisting of:

(i) 0.5 mm,
(ii) 1 mm,
(iii) 2 mm,
(iv) half the cylinder edge height, and
(v) the entire cylinder edge height,
to the cylinder edge surface.

8. The method as claimed in claim 5, wherein the protective film is applied to the optical front surface and to the cylinder edge surface at a temperature of the protective film selected from the group consisting of:
   (i) between 45° C. and 85° C.,
   (ii) between 50° C. and 80° C.,
   (iii) between 55° C. and 75° C.,
   (iv) between 60° C. and 70° C.,
   (v) between 62° C. and 68° C., and
   (vi) between 64° C. and 66° C.

9. The method as claimed in claim 8, further comprising:
   applying the protective film to the optical front surface and the cylinder edge surface with a mechanical mold part.

10. The method as claimed in claim 8, further comprising:
    applying the protective film while producing an atmospheric negative pressure between the protective film and at least one of the optical front surface and the cylinder edge surface, wherein the atmospheric negative pressure is selected from the group consisting of:
    (i) between 10 and 1,000 hPa,
    (ii) between 100 and 900 hPa,
    (iii) between 200 and 800 hPa,
    (iv) between 300 and 700 hPa, and
    (v) between 400 and 600 hPa.

11. The method as claimed in claim 5, wherein the protective film is applied within a period of time selected from the group consisting of:
    (i) less than 72 hours,
    (ii) less than 48 hours,
    (iii) less than 24 hours,
    (iv) less than 12 hours,
    (v) less than 6 hours,
    (vi) less than 3 hours,
    (vii) less than 1 hour, and
    (viii) less than 30 minutes
after completion of the optically finished surface.

12. The method as claimed in claim 5, further comprising:
    packing the spectacle lens blank with the applied protective film.

13. The method as claimed in claim 12, further comprising:
    dispatching the packed spectacle lens blank.

14. The method as claimed in claim 12, further comprising:
    unpacking the packed spectacle lens blank; and
    providing a temporary marking on the protective film.

15. The method as claimed in claim 14, further comprising:
    performing at least one process selected from the group consisting of:
    (i) shaping the surface opposite from the optically finished surface;
    (ii) applying at least one functional layer to the opposite shaped surface;
    (iii) applying a temporary marking on the protective film;
    (iv) edging or remote edging of the cylinder edge surface to adapt the cylinder edge to a shape of a frame receiving a ready-to-use spectacle lens;
    (v) blocking;
    (vi) removing the protective film; and
    (vii) applying at least one functional layer to the optically finished surface after removing the protective film.

16. The method as claimed in claim 12, further comprising:
    unpacking the packed spectacle lens blank; and
    blocking the unpacked spectacle lens blank on the protective film with a block piece.

17. The method as claimed in claim 16, further comprising:
    performing at least one process selected from the group consisting of:
    (i) shaping the surface opposite from the optically finished surface;
    (ii) applying at least one functional layer to the opposite shaped surface;
    (iii) applying a temporary marking on the protective film;
    (iv) edging or remote edging of the cylinder edge surface to adapt the cylinder edge to a shape of a frame receiving a ready-to-use spectacle lens;
    (v) removing the protective film; and
    (vi) applying at least one functional layer to the optically finished surface after removing the protective film.

* * * * *